(12) United States Patent (10) Patent No.: US 9,022,337 B2
Petruskavich (45) Date of Patent: May 5, 2015

(54) APPARATUS AND METHODS FOR SECURING PRODUCTS

(71) Applicant: Halo Metrics Inc., Richmond (CA)

(72) Inventor: John Michael Petruskavich, Oakville (CA)

(73) Assignee: Halo Metrics Inc., Richmond (CA)

( * ) Notice: Subject to any disclaimer, the term of this patent is extended or adjusted under 35 U.S.C. 154(b) by 282 days.

(21) Appl. No.: 13/664,202

(22) Filed: Oct. 30, 2012

(65) Prior Publication Data

US 2013/0153720 A1 Jun. 20, 2013

Related U.S. Application Data

(60) Provisional application No. 61/576,932, filed on Dec. 16, 2011.

(51) Int. Cl.
| | |
|---|---|
| *A47G 1/10* | (2006.01) |
| *A47F 7/00* | (2006.01) |
| *F16M 11/04* | (2006.01) |
| *F16M 11/08* | (2006.01) |
| *F16M 13/00* | (2006.01) |

(52) U.S. Cl.
CPC .............. *A47F 7/0042* (2013.01); *F16M 11/041* (2013.01); *F16M 11/08* (2013.01); *F16M 13/00* (2013.01); *Y10T 29/49826* (2015.01)

(58) Field of Classification Search
USPC ......... 248/176.1, 310, 316.4, 346.03, 346.06, 248/346.07
See application file for complete search history.

(56) References Cited

U.S. PATENT DOCUMENTS

| | | | |
|---|---|---|---|
| 161,088 A | * | 3/1875 | Bacon ........................ 248/229.12 |
| 2,164,299 A | * | 6/1939 | Mandell et al. .................. 40/741 |
| 3,410,122 A | | 11/1968 | Moses |
| 3,744,282 A | | 7/1973 | Hemphill |
| 3,965,705 A | | 6/1976 | Nadler |
| 4,028,913 A | | 6/1977 | Falk |
| 4,170,334 A | | 10/1979 | Villanueva |
| 4,585,202 A | | 4/1986 | Parsekian |

(Continued)

FOREIGN PATENT DOCUMENTS

| | | |
|---|---|---|
| CA | 2232729 A1 | 9/1999 |
| CA | 2246139 A1 | 2/2000 |

(Continued)

OTHER PUBLICATIONS

HC7332-B Product Summary Sheet, HaloMetrics Inc., marked 2010.

(Continued)

*Primary Examiner* — Gwendolyn W. Baxter
(74) *Attorney, Agent, or Firm* — Oyen Wiggs Green & Mutala LLP

(57) ABSTRACT

Apparatus for securing products are provided. Each of a pair of elongate retaining members is pivotally secured at a first end of a base. Each of a pair of carriages is movable along a corresponding one of the retaining members and fixable to the corresponding one of the retaining members at a plurality of locations. Each carriage has a clip for capturing a projecting portion of the product. A stop member engages a portion of the product spaced apart from the projecting portions captured by the clips. The stop member is movable toward the clips in a single degree of freedom and is fixable to the base at a plurality of locations along the degree of freedom. Methods of securing a product using the apparatus are provided.

23 Claims, 10 Drawing Sheets

(56) References Cited

U.S. PATENT DOCUMENTS

| | | | |
|---|---|---|---|
| 4,696,449 | A | 9/1987 | Woo |
| 4,738,127 | A | 4/1988 | Johnson |
| 4,935,047 | A | 6/1990 | Wu |
| 5,052,198 | A | 10/1991 | Watts |
| 5,052,199 | A | 10/1991 | Derman |
| 5,135,197 | A | 8/1992 | Kelley |
| 5,168,114 | A | 12/1992 | Enget |
| 5,277,042 | A | 1/1994 | Tobias |
| 5,351,508 | A | 10/1994 | Kelley |
| 5,582,044 | A | 12/1996 | Bolich |
| 5,595,074 | A | 1/1997 | Munro |
| 5,642,634 | A | 7/1997 | Perry |
| 5,836,183 | A | 11/1998 | Derman |
| 5,857,568 | A | 1/1999 | Speirs |
| 5,927,108 | A | 7/1999 | Pierce |
| 6,138,483 | A | 10/2000 | Galant |
| 6,237,375 | B1 | 5/2001 | Wymer |
| 6,308,928 | B1 | 10/2001 | Galant |
| 6,443,417 | B2 | 9/2002 | Galant |
| 6,763,690 | B2 | 7/2004 | Galant |
| 7,032,872 | B2 * | 4/2006 | Sullivan .................. 248/346.07 |
| 7,174,752 | B2 | 2/2007 | Galant |
| 8,240,628 | B2 * | 8/2012 | Huang ........................ 248/316.1 |
| 8,413,943 | B1 * | 4/2013 | Li ................................. 248/454 |
| 8,544,161 | B2 * | 10/2013 | Carnevali ........................ 29/450 |
| 2001/0001926 | A1 | 5/2001 | Edmondson |
| 2001/0038062 | A1 | 11/2001 | Galant |
| 2010/0237210 | A1 * | 9/2010 | Anderson et al. .......... 248/274.1 |
| 2013/0105644 | A1 * | 5/2013 | Yu .............................. 248/125.7 |

FOREIGN PATENT DOCUMENTS

| | | |
|---|---|---|
| CA | 2345410 A1 | 2/2001 |
| CA | 2478646 A1 | 12/2003 |
| GB | 2362423 A | 11/2001 |

OTHER PUBLICATIONS

Brochure titled "Product Blast" InVue Security Products, Oct. 2011.
NB 80 Product Brochure, HaloMetrics Inc., Dec. 16, 2009.
LT-100 Product Brochure, HaloMetrics Inc., Dec. 16, 2009.
Se-Kure Controls, Inc., Retrofit Instructions for PTR-600 Laptop Bracket, Se-Kure Controls, Inc., Feb. 13, 2003.
Se-Kure Controls, Inc., PTR-600 Conversion to Expanded PTR-600-16 Version, Se-Kure Controls, Inc., marked 2003.
Se-Kure Controls, Inc., PTR-630-19 Retrofit Kit for use with Wide Notebook Computers, Se-Kure Controls, Inc., marked 2003.
Se-Kure Controls, Inc., PTR-700 DVD Lock-Down System, Se-Kure Controls, Inc., undated. Available at least as early as 2010.
Se-Kure Controls, Inc., Installation Instructions for the SC-700RL-11 Laptop Security Kit, Se-Kure Controls, Inc., Dec. 22, 2003.
Se-Kure Controls, Inc., Installation Instructions for the SC-700RL-19 Laptop Security Kit, Se-Kure Controls, Inc., Dec. 22, 2003.
Se-Kure Controls, Inc., Catalog 803, p. 23, Se-Kure Controls, Inc., Lock Down Security Devices, 2005.
Installation Instructions for the SC-1203A (PDA) Gripper Kit, Se-Kure Controls, Inc., Dec. 23, 2003.
Installation Instructions for the Office Depot Laptop Security Display Bracket Model No. OD-99-730, Se-Kure Controls, Inc., Jul. 21, 1999.
Sony e-Reader Assembly Instructions, InVue Security Products, Nov. 25, 2009.
Series 1000 eReader Status Security System, InVue Security Products, marked 2010.
TB1 High Security Tablet Stand, InVue Security Products, marked 2011.
TB2 Installation Instructions, InVue Security Products, Mar. 28, 2012.
Photograph of tablet security bracket model No. HM-3101200, HaloMetrics Inc. Approximately Apr. 2011.
Photographs of tablet security bracket model No. HM-3101210, HaloMetrics, Inc. Approximately Dec. 2010.
Vise3 System, RTF Systems Inc. Web printed Feb. 4, 2013. <http://www.rtfglobal.com/products/vise3-security-and-charging-solution/>, Sep. 27, 2014.
Boommerang 4, RTF Global, Inc. Web printed Feb. 4, 2013. <http://www.rtfglobal.com/products/boomerangpad-stay-straight-merchandise/>.

* cited by examiner

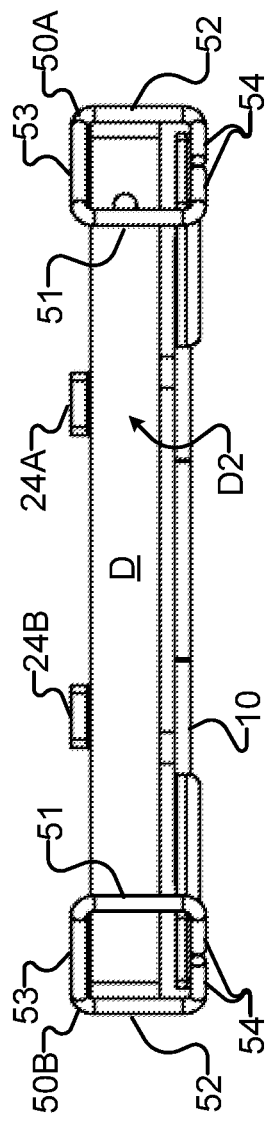
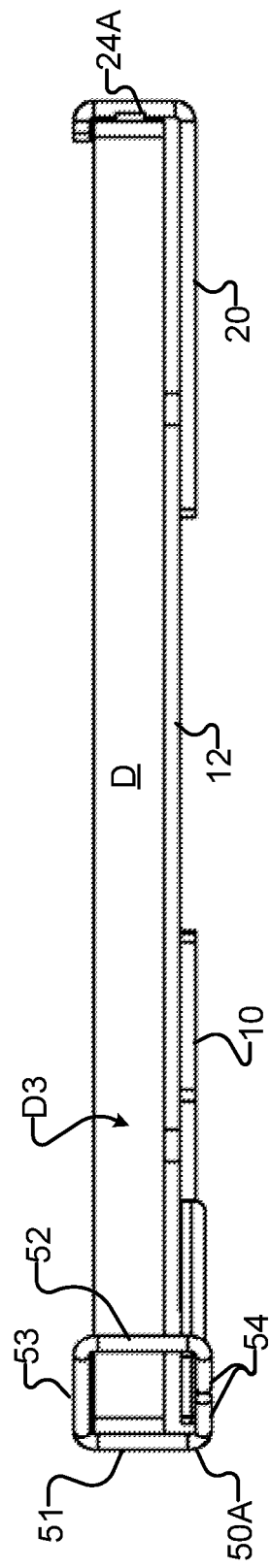
FIG. 2A
FIG. 2B

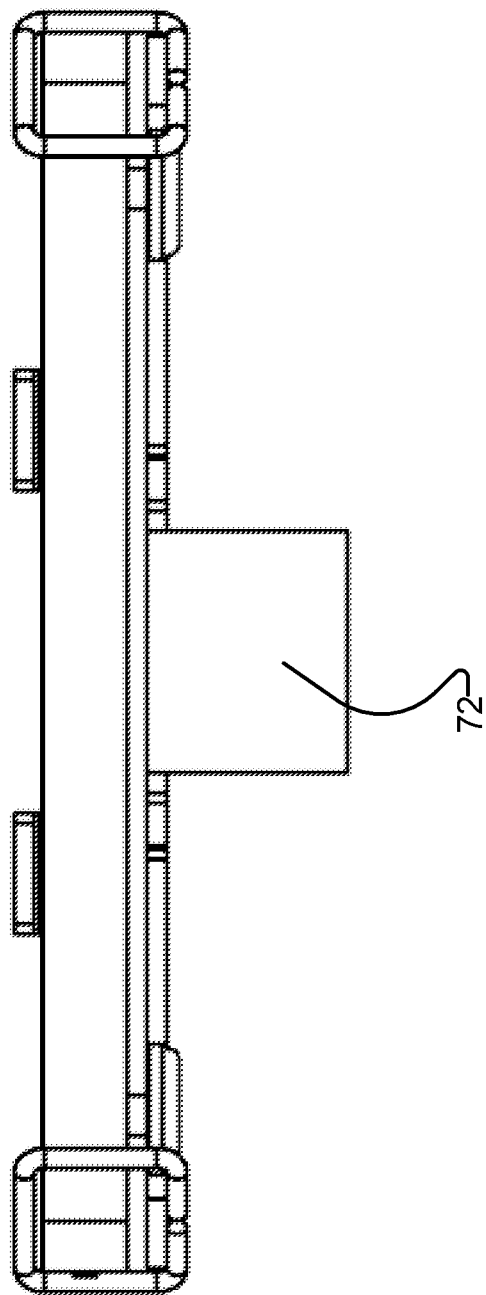

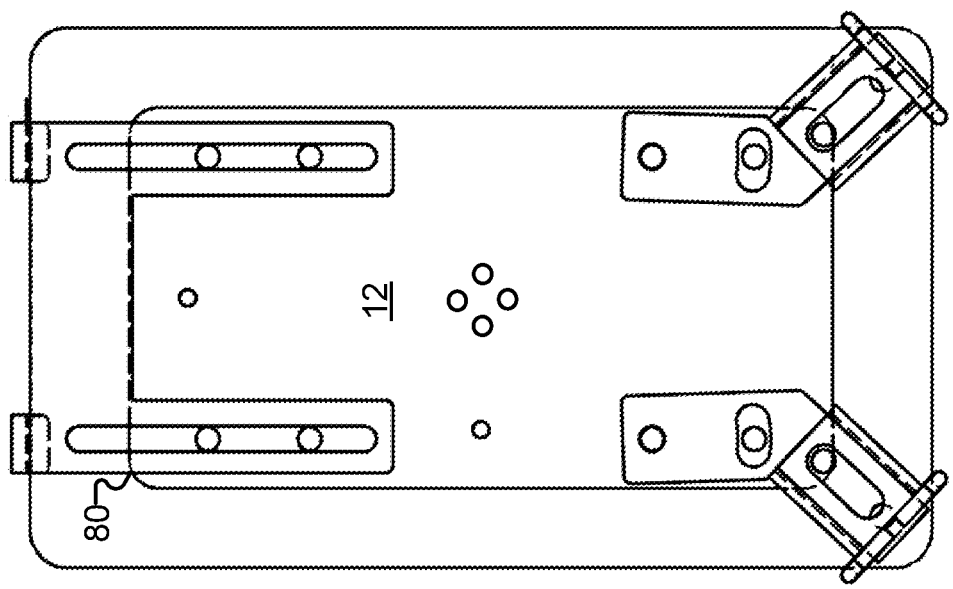

APPARATUS AND METHODS FOR SECURING PRODUCTS

TECHNICAL FIELD

The application relates to apparatus and methods for securing products. Particular embodiments of the invention provide apparatus and methods for securing tablet computers, e-readers, system controllers and other devices for retail display.

BACKGROUND

Consumer technology products are often sold to the public in retail settings that permit pre-sale customer interaction with display models of the products offered for sale. Such displays find particular application in the sale of touch screen devices, such as touch screen equipped mobile phones, touch screen equipped tablet computers, and the like. An implication of allowing pre-sale customer interaction with display models is exposing such display models to risk of theft. Display models may be secured against physical removal from store premises to ameliorate the risk of theft. It is preferable that the means used to secure display models not detract unduly from the aesthetic and functional properties of the display model. It is also preferable that the means used to secure a display model interfere with customer interaction with the product as little as possible.

Consumer technology products come in a wide range of dimensions. It is preferable that means for securing display models be able to secure differently dimensioned products so as to address the inconvenience and cost which would occur if a different security apparatus was needed for every differently dimensioned product. Where means for securing display models are adjustable and/or configurable to secure differently dimensioned products, it is preferable that adjustment and/or reconfiguration of the means be simple. It is also preferable that the adjustment and/or reconfiguration of the means be configured to engage securely with a range of products having different dimensions.

There is accordingly a general desire for apparatus and methods for securing display models of consumer products. There is particular need for apparatus and methods for securing display models of tablet computers and touch screen devices.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one embodiment, apparatus for securing a product is provided. The apparatus has a base; a pair of retaining members, each retaining member being pivotally secured at a first end thereof to the base; a pair of carriages, each carriage fixable to a corresponding one of the retaining members, each carriage having a clip for capturing a projecting portion of the product; and a stop member movable toward the clips in a single degree of freedom and fixable to the base at a plurality of locations along the degree of freedom, the stop member having a portion for engaging a portion of the product that is spaced apart from the projecting portions captured by the clips.

In some embodiments, the retaining members have a first elongate portion pivotally secured to the base and a second elongate portion extending at an outwardly obtuse angle from the first portion, and each one of the carriages is moveable along the second elongate portion of the corresponding one of the retaining members and fixable to the second elongate portion at a plurality of locations. In some embodiments, the retaining members are pivotally secured to the base with two points of contact, and the two points of contact are provided by a pair of fasteners engaged with a pair of longitudinally spaced apertures on the respective retaining members, first ones of the apertures being proximate to a first end of the respective retaining member and second ones of the apertures being distal from the first end of the respective retaining members, the second ones of the apertures being an oblong aperture positioned to permit rotational movement of the retaining member about an axis co-axial with the first ones of the apertures, with the carriages being provided on the retaining members distally of the first and second apertures.

In another embodiment, apparatus for securing a planar product having a polygonal shape is provided. The apparatus has a base, a pair of rotatable retaining members with clips telescopically engaged at a second end of the retaining members for engaging with two corners of the product, first ends of the retaining members being securable to the base to prevent relative motion of the rotatable retaining members relative to the base and a slideable stop member engaged at a second end of the base for engaging with an edge of the product opposite the two corners, the slideable stop member being adjustable towards the pair of rotatable retaining members and securable to the base to prevent relative motion of the slideable stop member relative to the base.

In one embodiment, a method for securing a product using an apparatus having a base; a pair of retaining members, each retaining member pivotally secured at a first end thereof to the base; a pair of carriages, each carriage movable along a corresponding one of the retaining members and fixable to the corresponding one of the retaining members at a plurality of locations, each carriage having a clip for capturing a projecting portion of the product, and a stop member movable toward the clips in a single degree of freedom and fixable to the base at a plurality of locations along the degree of freedom, the stop member having a portion for engaging a portion of the product which is spaced apart from the projecting portions captured by the clips is provided. The method includes capturing projecting portions of the product in the clips, fixing the positions of the carriages relative to the retaining members, engaging the spaced apart portion of the product with the portion of the stop member for engaging the spaced apart portion of the product, developing tension in the retaining members by urging the product toward the clips with the stop member, and, when the retaining members are under tension, fixing the position of the stop member relative to the base.

BRIEF DESCRIPTION OF DRAWINGS

The accompanying drawings show non-limiting example embodiments.

FIG. 2A is a lower end elevation view of the apparatus shown in FIG. 1.

FIG. 2B is a side elevation view of the apparatus shown in FIG. 1.

FIG. 5A is a lower end elevation view of the apparatus shown in FIG. 5.

FIG. 6 is a bottom plan view of an apparatus according to a further example embodiment used to secure a different rectangular device.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
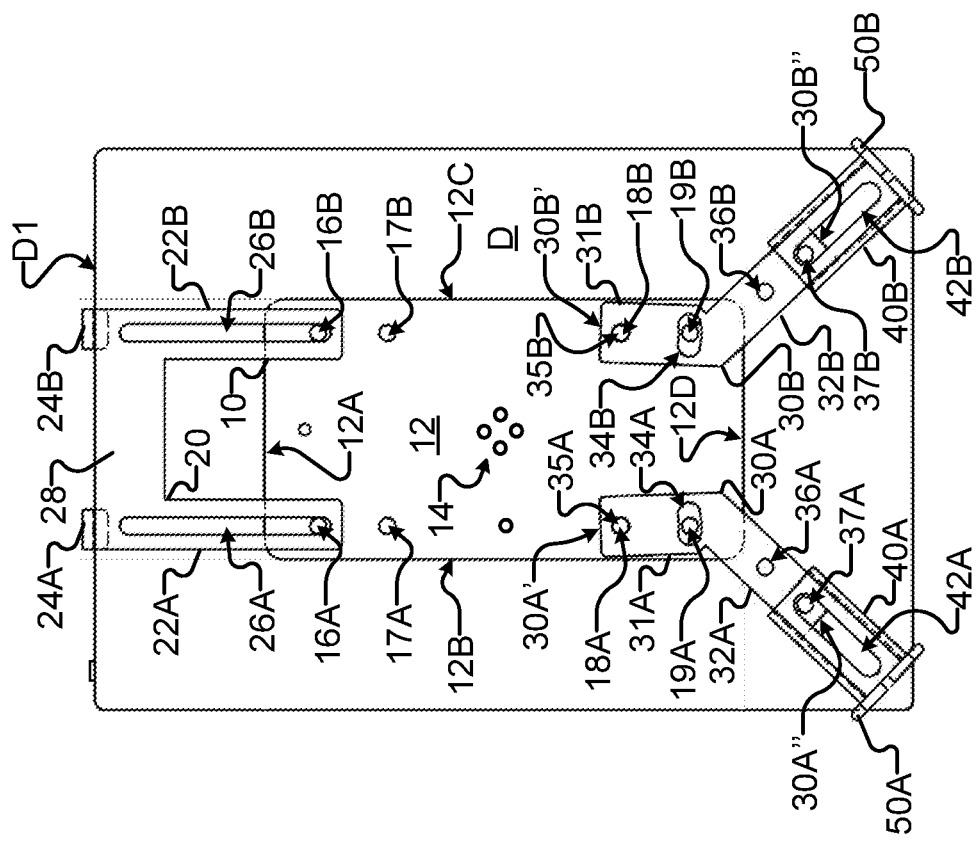
FIG. 1 is a bottom plan view of an apparatus according to an example embodiment used to secure a rectangular device.
Figure 3:
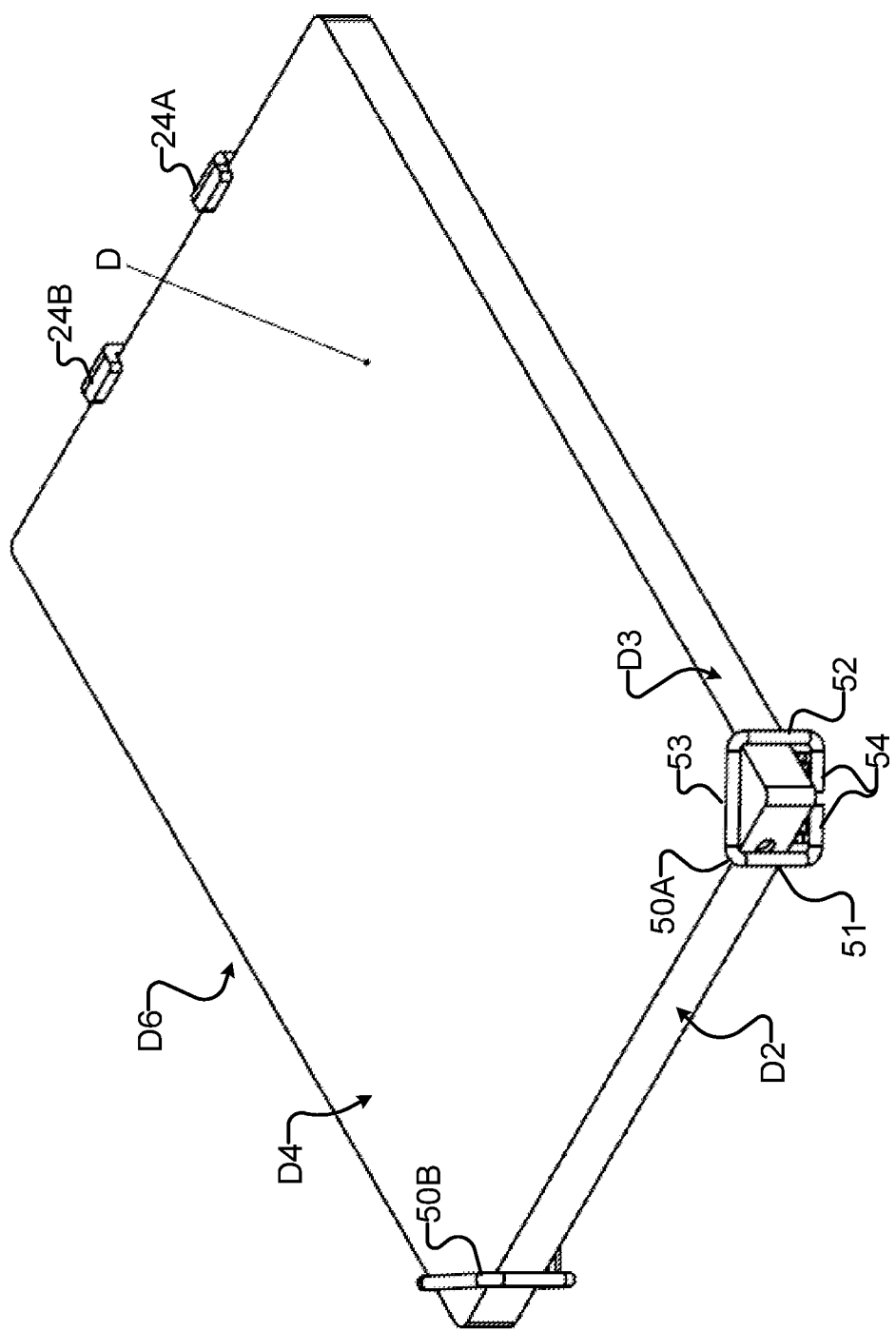
FIG. 3 is a top perspective view of the apparatus shown in FIG. 1.
Figure 4:
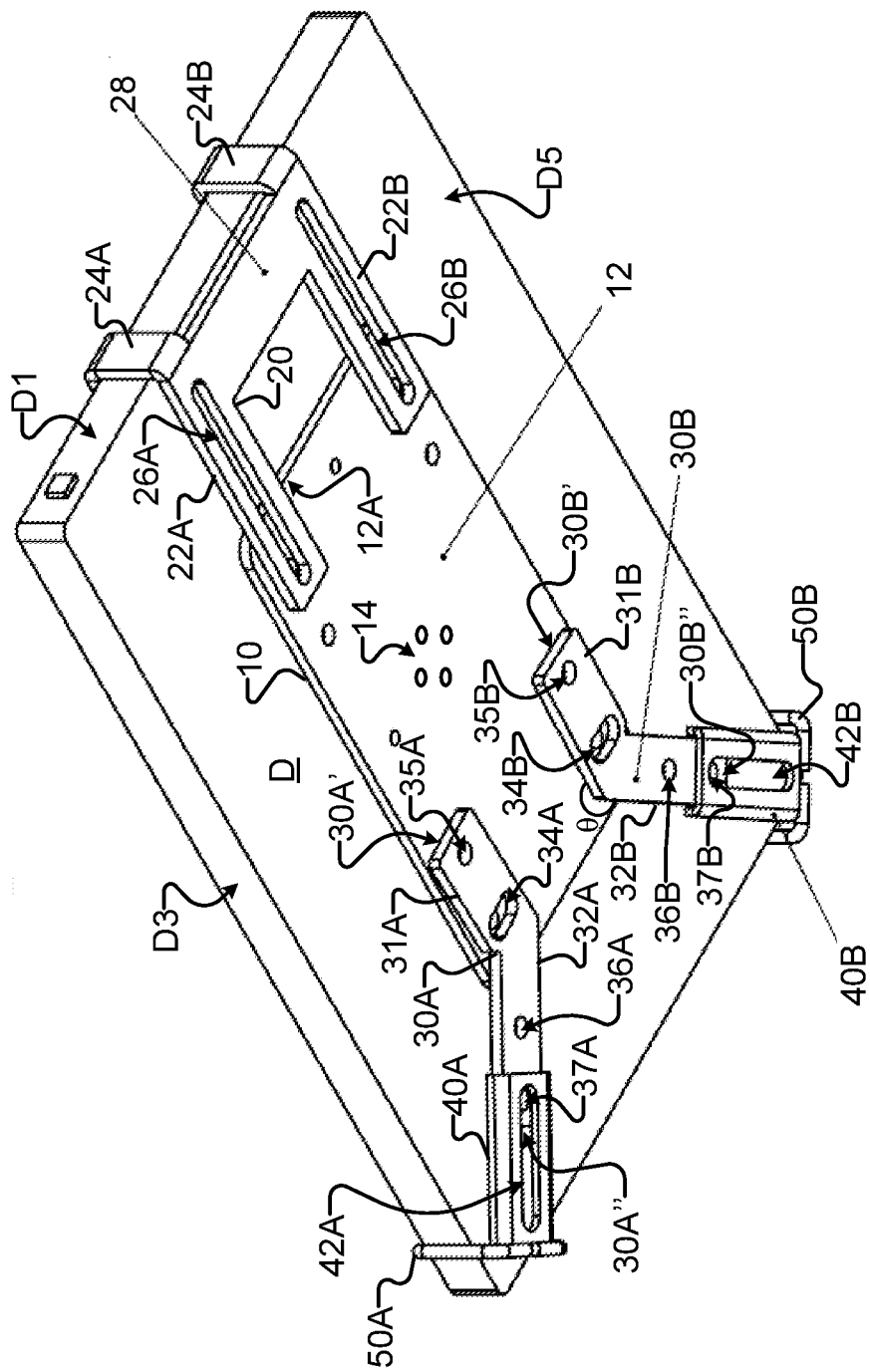
FIG. 4 is a bottom perspective view of the apparatus shown in FIG. 1.

FIGS. 1-4 show an apparatus 10 according to an example embodiment used to secure an example device D. More particularly:

FIG. 1 is a bottom plan view of apparatus 10.
FIG. 2A is a lower end elevation view of apparatus 10.
FIG. 2B is a side elevation view of apparatus 10.
FIG. 3 is a top perspective view of apparatus 10.
FIG. 4 is a bottom perspective view of apparatus 10.

The illustrated device D has a rectangular slab form factor. Device D may comprise, for example, a tablet computer, a mobile phone, an e-reader, a system controller (universal remote control), or some other device.

Apparatus 10 comprises a base 12. In the illustrated embodiment, base 12 comprises a generally flat, rectangular plate. Base 12 comprises a plurality of centrally located threaded apertures 14. Apertures 14 may receive fasteners, such as for fastening base 12 to a post (not shown in the drawings), which may in turn be secured to a stationary object, such as a counter in a retail store. Apertures 14 may be countersunk so that the heads of fasteners received therein sit below the surface of base 12 that contacts device D. In some embodiments, the countersinking can prevent tampering with the fasteners as they are concealed by device D when device D contacts base 12. Base 12 also comprises a plurality of peripherally located apertures, individually enumerated as 16A, 16B, 17A, 17B, 18A, 18B, 19A and 19B. In some embodiments, one or more of apertures 16A, 16B, 17A, 17B, 18A, 18B, 19A and 19B is threaded.

A stop member 20 is secured to base 12 and extends outward of a first side 12A of base 12. Stop member 20 comprises two spaced apart arms 22A and 22B (arms 22A and 22B may be collectively referred to herein as arms 22). In the illustrated embodiment, arms 22A and 22B are J-shaped, having hooked portions 24A and 24B, respectively (hooked portions 24A and 24B may be referred to collectively herein as hooked portions 24). In FIGS. 1-4, hooked portions 24 of arms 22 engage a first side D1 of device D at spaced apart locations.

The elongate portions of arms 22A and 22B comprise oblong apertures 26A and 26B, respectively (apertures 26A and 26B may be referred to collectively herein as apertures 26). The longitudinal dimensions of apertures 26 are parallel to the lengths of arms 22. In the illustrated embodiment, cross member 28 extends between arms 22 and fixes arms 22 in parallel relation. In other embodiments, stop member 22 may comprise a single arm (e.g., having a J-shaped portion configured to engage side D1 of device D at and between where arms 22 engage side D1) or may comprise more than two arms.

Arms 22 may be secured to base 12 by headed fasteners (not shown in the drawings) whose shanks pass through apertures 26 and engage corresponding features (e.g., threaded apertures) of base 12. For example, in the illustrated embodiment, apertures 26 are shown simultaneously registered with apertures 16A and 16B in base 12, such that fasteners may pass through apertures 26 and engage apertures 16A and 16B.

Heads of the fasteners that penetrate apertures 26 may bear against the outward surfaces of arms 22 adjacent apertures 26 to clamp arms 22 flush against base 12. The distance between the hooked portions 24 of arms 22 and the first side 12A of base 12 may be fixed by operating headed fasteners (not shown in the drawings) that penetrate apertures 26 to clamp arms 22 against base 12. Fasteners used to secure arms 22 to base 12 may comprise security fasteners, such as security screws. The oblong shape of apertures 26 and the fixed parallel relation of arms 22 permit single degree of freedom movement of stop member 20 along a direction perpendicular to side 12A of base 12 (and side D1 of device D) while fasteners penetrate apertures 26 and engage base 12. Thus, stop member 20 is adjustable relative to base 12.

Apparatus 10 also comprises a pair of retaining members 30A and 30B (retaining members 30A and 30B may be referred to herein as retaining members 30). In apparatus 10, retaining members 30 are located on base 12 in mirror symmetry. Retaining members 30 are elongate, generally flat, and have arcuate configuration. More particularly, in the illustrated embodiment, retaining members 30 have a piecewise arcuate configuration wherein generally linear first portions 31 (individually enumerated as 31A and 31B) and generally linear second portions 32 (individually enumerated as 32A and 32B) form an outwardly obtuse angle θ (FIG. 4). In the illustrated embodiment, the angle θ formed between first portions 31 and their corresponding second portions 32 is approximately 135°. In some embodiments, angle θ is between about 105° and about 160°, including any angle therebetween. Angle θ assists in allowing clips 50 to squarely engage the corners of device D, as outlined in more detail below. Angle θ can be adjusted in different embodiments depending on the typical range of length-to-width ratios of the products to be secured in apparatus 10.

A first pair of longitudinally spaced apertures are defined at the first end (individually enumerated as 30A' and 30B') of each retaining member 30. In the illustrated embodiment, apertures 34A and 35A are defined through and longitudinally spaced along first portion 31A of retaining member 30A, and apertures 34B and 35B are defined through and longitudinally spaced along first portion 31B of retaining member 30B. Apertures 34A and 34B (which may be referred to collectively herein as apertures 34), are distal from the first ends 30A' and 30B' of retaining members 30. Apertures 35A and 35B (which may be referred to collectively herein as apertures 35), are proximate first ends 30A' and 30B' of retaining members 30.

In the illustrated embodiment, apertures 34A and 35A are shown registered with apertures 18A and 19A of base 12, and apertures 34B and 35B are shown registered with apertures 18B and 19B of base 12. Retaining members 30 may be secured to base 12 by registering apertures 35A and 35B with corresponding posts (not shown in the drawings) connected to base 12 and using headed fasteners (not shown in the drawings) whose shanks pass through apertures 35 and engage corresponding features (e.g., threaded apertures) of base 12 to retain members 30 flush against base 12. In alternative embodiments, threaded fasteners are used without posts. The posts which register with apertures 35 may be integrally formed with base 12 or provided as separate elements that cooperate with corresponding features of base 12 (e.g., as threaded fasteners that engage threaded apertures in base 12, such as apertures 18A and 18B, for example). In some such embodiments, headed fasteners registered with apertures 35 secure retaining members 30 to base 12. Fasteners used to secure retaining members 30 to base 12 may comprise security fasteners, such as security screws.

In the illustrated embodiment, apertures 34 are oblong. The longitudinal dimensions of apertures 34 are transverse to the lengths of first portions 31A and 31B of retaining members 30, and generally perpendicular to the direction from apertures 34 to apertures 35. Advantageously, registration of apertures 35 with posts on base 12 and registration of transverse oblong configuration of apertures 34 with posts on base 12 (e.g., shanks of threaded fasteners engaged with base 12, such as in apertures 19A and 19B, for example) provide constrained pivotal movement of retaining members 30 about axes co-axial with apertures 35. The angular orientation of members 30 about apertures 35 may be fixed by operating headed fasteners (not shown in the drawings) that penetrate apertures 34 to clamp members 30 against base 12.

In the illustrated embodiment, apertures 34, 35 provide two points of securement for retaining members 30 while allowing retaining members 30 to be pivoted about apertures 35. Retaining members 30 can thus be pivoted to allow alignment of clips 50 squarely or substantially squarely with the corners of device D, as outlined in greater detail below, while retaining members 30 are securely held in position at two points. This configuration can make it more difficult for a person to remove device D from apparatus 10 than would be the case if retaining member 30 had only a single point of securement near first end 30', since retaining member 30 could be more easily twisted with only a single point of securement.

A second pair of apertures are defined at the second end (individually enumerated as 30A" and 30B") of each retaining member 30. In the illustrated embodiment, apertures 36A and 37A are defined through and longitudinally spaced along second portion 32A of retaining member 30A, and apertures 36B and 37B are defined through and longitudinally spaced along second portion 32B of retaining member 30B. Apertures 36A and 36B (which may be referred to collectively herein as apertures 36), are distal from the second ends 30A" and 30B" of retaining members 30. Apertures 37A and 37B (which may be referred to collectively herein as apertures 37), are proximate the second ends 30A" and 30B" of retaining members 30.

Carriages 40A and 40B are mounted on the second ends 30A" and 30B", respectively, of retaining members 30. In the illustrated embodiment, carriages 40A and 40B (which may be referred to collectively herein as carriages 40) are mounted for longitudinal travel along second portions 32A and 32B, respectively of retaining members 30. In the illustrated embodiment, carriages 40 are elongate and have U-channel configuration in cross-section (this configuration is most clearly visible in carriage 40 shown in FIG. 4). The flanges of carriages 40 confine the opposed longitudinal sides of second portions 32A and 32B of retaining members 30. The bases of carriages 40A and 40B comprise oblong apertures 42A and 42B, respectively (apertures 42A and 42B may be referred to collectively herein as apertures 42). The longitudinal dimensions of apertures 42 are parallel to the lengths of carriages 40. When carriages 40 are mounted on retaining members 30, the longitudinal dimensions of apertures 42 are parallel to the lengths of respective ones of second portions 32A and 32B of retaining members 30.

Carriages 40 may be secured to retaining members 30 by headed fasteners (not shown in the drawings) whose shanks pass through apertures 42 and engage either or both of apertures 36 and 37 (e.g., by threaded connection). The heads of the fasteners may bear against the outward surfaces of carriages 40 adjacent apertures 42 to retain the bases of carriages 40 flush against retaining members 30. The relative positions of carriages 40 and retaining members 30 may be fixed by operating headed fasteners (not shown in the drawings) that penetrate apertures 42 to clamp carriages 40 against retaining members 30. Fasteners used to secure carriages 40 to retaining members 30 may comprise security fasteners, such as security screws.

Advantageously, the oblong shape of apertures 42 and the flanges of carriages 40 permit single degree of freedom movement of carriages 40 in directions parallel to the lengths of second portions 32A and 32B of retaining members 30 while fasteners penetrate apertures 42 and engage retaining members 30.

Carriages 40 comprise clips 50 (individually enumerated as 50A and 50B). Clips 50 are configured to capture projecting portions of device D. In the illustrated embodiment, clips 50 each comprise a pair of opposed first portions and a pair of opposed second portions. The first portions of clips 50 are enumerated as 51 and 52. The second portions of clips 50 are enumerated as 53 and 54. The first portions of each clip 50 are mutually parallel. The second portions of each clip 50 are mutually parallel and perpendicular to the first portions. In the illustrated embodiment, clips 50 comprise C-shaped tubular members. The C-shaped tubular members define a generally rectangular shape (best seen in FIG. 3), in which each side of the rectangle contacts a different side of device D.

In other embodiments, clips 50 have configurations different from the configuration of the illustrated embodiment. For example, the clips could comprise securable clamps for engaging with the corners of device D, a solid housing defining a generally rectangularly shaped opening for engaging with the corners of device D in a manner similar to clips 50, a mechanism for preventing access to certain portions of device D while simultaneously engaging with the corners of device D, or the like. The height of the clips could be modified depending on the thickness of the device D to be secured.

As shown in FIGS. 1-4, in the illustrated embodiment clips 50 engage adjacent corners of device D. As can best be seen in FIG. 3, first portion 51 abuts second side D2 and first portion 52 abuts third side D3. Sides D2 and D3 are adjacent and meet at a corner of device D. As can best be seen in FIGS. 2A and 2B, second portion 53 abuts fourth side of D4 and second portion 54 abuts fifth side D5. Sides D4 and D5 are opposite one another. Sides D4 and D5 are both adjacent to each of sides D2 and D3. Side D1 of device D that is engaged with stop member 20 is opposite to the corners of device D engaged by clips 50.

In some embodiments, including the illustrated embodiment, clips 50 are configured to engage squarely with the corners of device D, i.e. to grip each side of device D (e.g.

sides D2 and D3 with respect to clip 50A in the illustrated embodiment) to an approximately equal extent. In the illustrated embodiment, second portions 53 and 54 extend across (i.e. intersect) the corners of device D at an angle of approximately 45°. Engagement of clips 50 squarely with the corners of device D can make unauthorized removal of device D from apparatus 10 more difficult by making it more difficult to twist device D out of clips 50.

It may be appreciated that device D cannot be removed from apparatus 10 in the configuration shown in FIGS. 1-4. In particular:

Translational movement of device D away from base 12 in a direction normal to base 12 is prevented by the abutment of side D4 of device D with J-shaped portions 24 of stop member 20 and second portions 53 of clips 50.

Translational movement of device D away from base 12 in directions crossing side 12A of base 12 is prevented by abutment of side D1 of device D with J-shaped portions 24 of stop member 20.

Translational movement of device D away from base 12 in directions crossing side 12D is prevented by abutment of side D2 of device D with first portions 51 of clips 50.

Translational movement of device D away from base 12 in directions crossing side 12B is prevented by abutment of side D3 of device D with first portion 52 of clip 50A.

Translational movement of device D away from base 12 in directions crossing side 12C is prevented by abutment of side D6 of device D with first portion 52 of clip 50B.

Rotational movement of device D about axes normal to base 12 is inhibited by the simultaneous abutment of side D1 of device D with J-shaped portions 24 of stop member 20 and of side D2 of device D with first portions 51 and 52 of clips 50.

Rotational movement of device D about axes parallel to the plane of base 12 is inhibited by the simultaneous abutment of side D4 of device D with J-shaped portions 24 of stop member 20, of second portions 53 of clips 50, and of side D5 with base 12.

It may be appreciated that apparatus 10 does not unduly obscure side D4 of device D (see in particular FIG. 3). This may be advantageous where device D is a touch screen device such as a touch screen equipped tablet computer and side D4 comprises the touch screen and where apparatus 10 is being used to secure device D in a setting (such as a retail setting) where user interaction with the device D is desired.

It will be appreciated that apparatus 10 is adjustable and capable of securing devices of different dimensions. Factors that contribute to the adjustability of apparatus 10 include:

The ability to fix the stop member 20 to the base 12 at a plurality of locations along arms 22 (by inserting fasteners through a plurality of locations through apertures 26). As a result, if, for example, sides D3 and D6 were shorter than depicted in FIGS. 1-4, stop member 20 could be moved in a direction toward side 12D and then fixed to base 12.

The ability to position carriages 40 at a plurality of locations along retaining members 30, which permits the distance between clips 50 to be adjusted. As a result, if, for example, side D2 of device D was shorter than depicted in FIGS. 1-4, carriages 40 could be moved along retaining members 30 in the direction of apertures 36 to reduce the distance between clips 50 to enable the outward first portions 52 of clips 50 to engage sides D3 and D6 of device D.

The transverse oblong configuration of apertures 34 and the ability for pivotal movement of retaining members 30 about axes co-axial with apertures 35. This allows adjustment of the angle of clips 50 relative to the corners of device D to be secured.

The obtuse angle θ formed between first portions 31 and second portions 32 of retaining members 30 can assist in facilitating square engagement of clips 50 with the corners of device D to be secured for devices having a wide range of length-to-width ratios.

Stop member 20 and retaining members 30 may be arranged to secure devices on apparatus 10 in different configurations than the configuration shown in FIGS. 1-4. The reconfigurability of apparatus 10 is provided by symmetrical arrangements of apertures 16A, 16B, 17A, 17B, 18A, 18B, 19A and 19B on base 12, which enable registration of the paired apertures defined in stop member 20 and in each of retaining members 30 with different pairs of apertures 16A, 16B, 17A, 17B, 18A, 18B, 19A and 19B. The symmetry of the arrangements of apertures 16A, 16B, 17A, 17B, 18A, 18B, 19A and 19B on base 12 may be described as follows:

the arrangement of apertures 16A, 17A, 18A, and 19A is longitudinally symmetric with the arrangement of apertures 16B, 17B, 18B and 19B;

the arrangement of apertures 16A and 16B is transversely symmetric with the arrangement of apertures 19A and 19B;

the arrangement of apertures 17A and 17B is transversely symmetric with the arrangement of apertures 18A and 18B; and the arrangement of each pair of adjacent ones of apertures 17A, 17B, 18A and 18B (i.e., pairs [17A, 17B], [17B, 18B], [18B, 18A] and [18A, 17A]) is rotationally symmetric with the arrangement of every other such pair.

In the illustrated embodiment, this symmetry manifests in the following properties:

apertures 17A, 17B, 18A and 18B are arranged at the corners of a square; and apertures 16A, 16B, 17A and 17B are arranged at the corners of a first rectangle, and apertures 18A, 18B, 19A, and 19B are arranged at the corners of a second rectangle whose sides are parallel to and have the same dimensions as the sides of the first rectangle.

It may be appreciated from the foregoing description and/or study of the drawings (e.g., FIG. 1) that apertures 26 may be arranged to simultaneously register with any of:

apertures 16A and 16B;
apertures 17A and 17B;
apertures 16A, 16B, 17A and 17B;
apertures 18A and 18B;
apertures 19A and 19B;
apertures 18A, 18B, 19A and 19B;
apertures 17A and 18A; and
apertures 17B and 18B.

It may also be appreciated from the foregoing description and/or study of the drawings (e.g., FIG. 1) that apertures 34 and 35 of retaining members 30 may be arranged to simultaneously register with any of:

apertures 16A and 17A;
apertures 16B and 17B;
apertures 18A and 19A; and
apertures 18B and 19B.

It will be appreciated, therefore, that where device D is rectangular such as is shown in FIGS. 1-4, apparatus 10 may be used to secure device D in not only the "portrait" type orientation shown but also a "landscape" type orientation.

Figure 5:
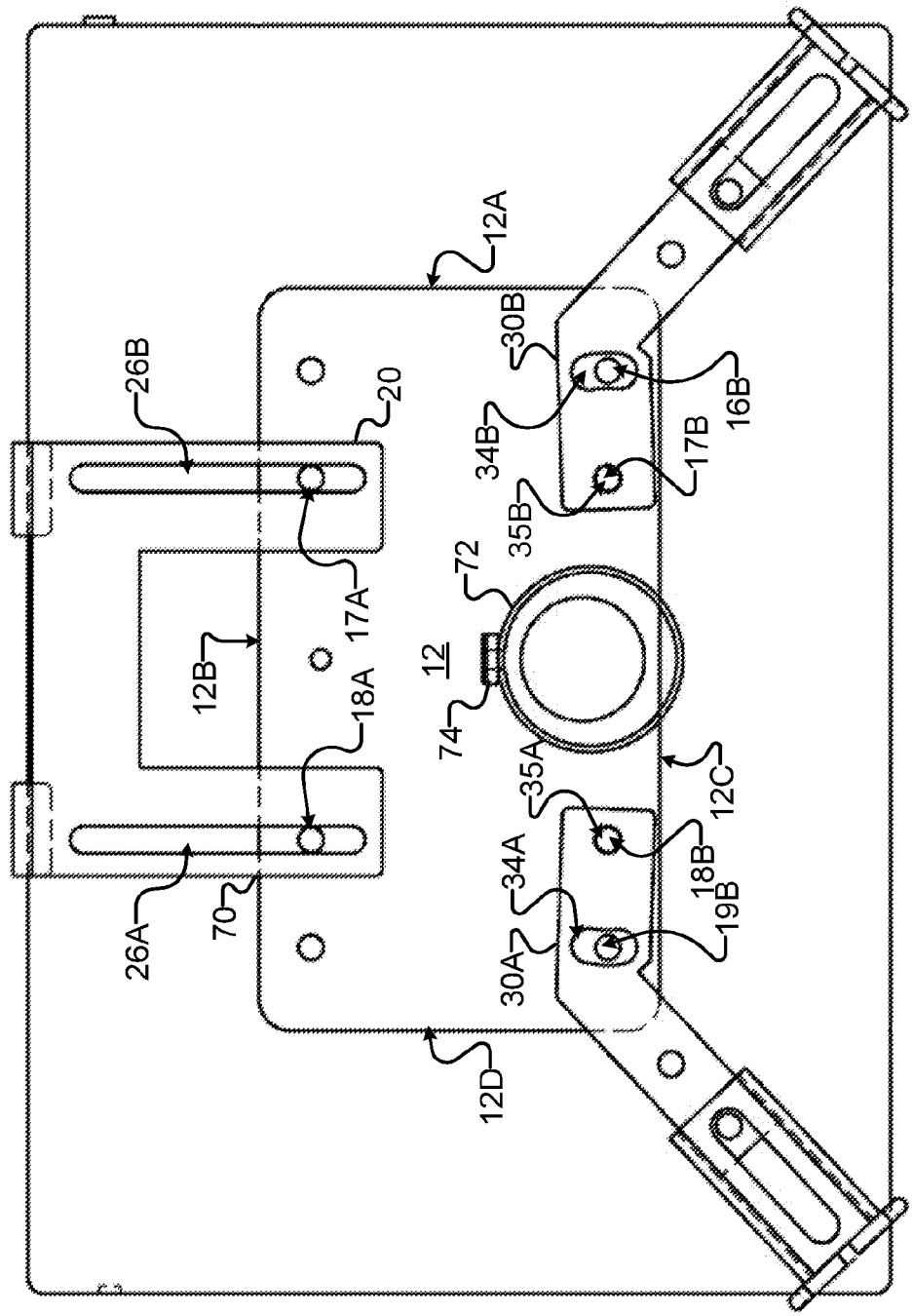
FIG. 5 is a bottom plan view of an apparatus according to another example embodiment used to secure a rectangular device.

FIG. 5 shows an example of an apparatus 70 according to another example embodiment. Apparatus 70 is a reconfiguration of apparatus 10. Components of apparatus 70 are identified in FIG. 5 using the same reference numerals used to identify like components of apparatus 10 in FIGS. 1-4. The configuration of apparatus 70 differs from the configuration of apparatus 10 in that:

- stop member 20 extends across side 12B of base 12 rather than side 12A;
- apertures 26A and 26B of stop member 20 are registered with apertures 17A and 18A, respectively, of base 12;
- retaining members 30 extend outward of the ends of side 12C of base 12 rather than side 12D;
- apertures 34A and 35A of retaining member 30A are registered with apertures 19B and 18B, respectively, of base 12; and
- apertures 34B and 35B of retaining member 30B are registered with apertures 16B and 17B, respectively, of base 12.

Figure 5B:
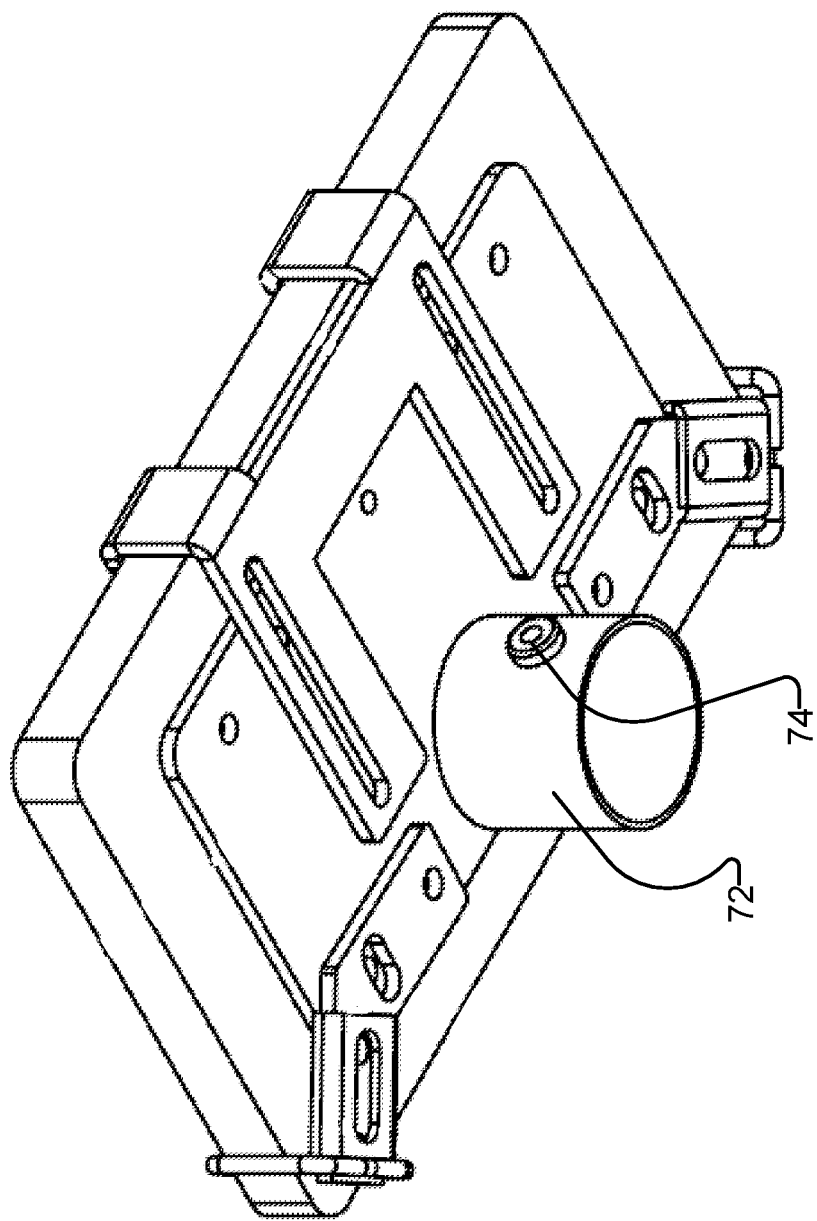
FIG. 5B is a bottom perspective view of the apparatus shown in FIG. 5.

Apparatus 70 also differs from apparatus 10 in that instead of centrally located apertures 14, apparatus 70 has a cylindrical tube 72 that extends generally normal to base 12 (cylindrical tube 72 can also be seen in FIGS. 5A and 5B). A post (e.g., attached to a stationary object, not shown in the drawings) may be inserted into tube 72 to support apparatus 70 (e.g., above a display counter). A threaded weld nut 74 registered with an aperture formed in the wall of tube 72 may receive a screw that interacts with a post (threaded weld nut 74 can also be seen in FIG. 5B). In some embodiments, the screw may bear against an outward surface of such a post. In other embodiments, the screw may engage a corresponding threaded aperture in the post to lock apparatus 70 to the post. In some embodiments, the screw may engage a corresponding elongate aperture in the post to permit base 12 to pivot about the post. The ability of base 12 to pivot about the post may allow devices secured in apparatus 10 to be rotated between portrait and landscape orientations, which may be useful in demonstrating adaptive screen technology of the devices. In other embodiments, tube 72 is fastenable to a post in other ways.

Figure 7:
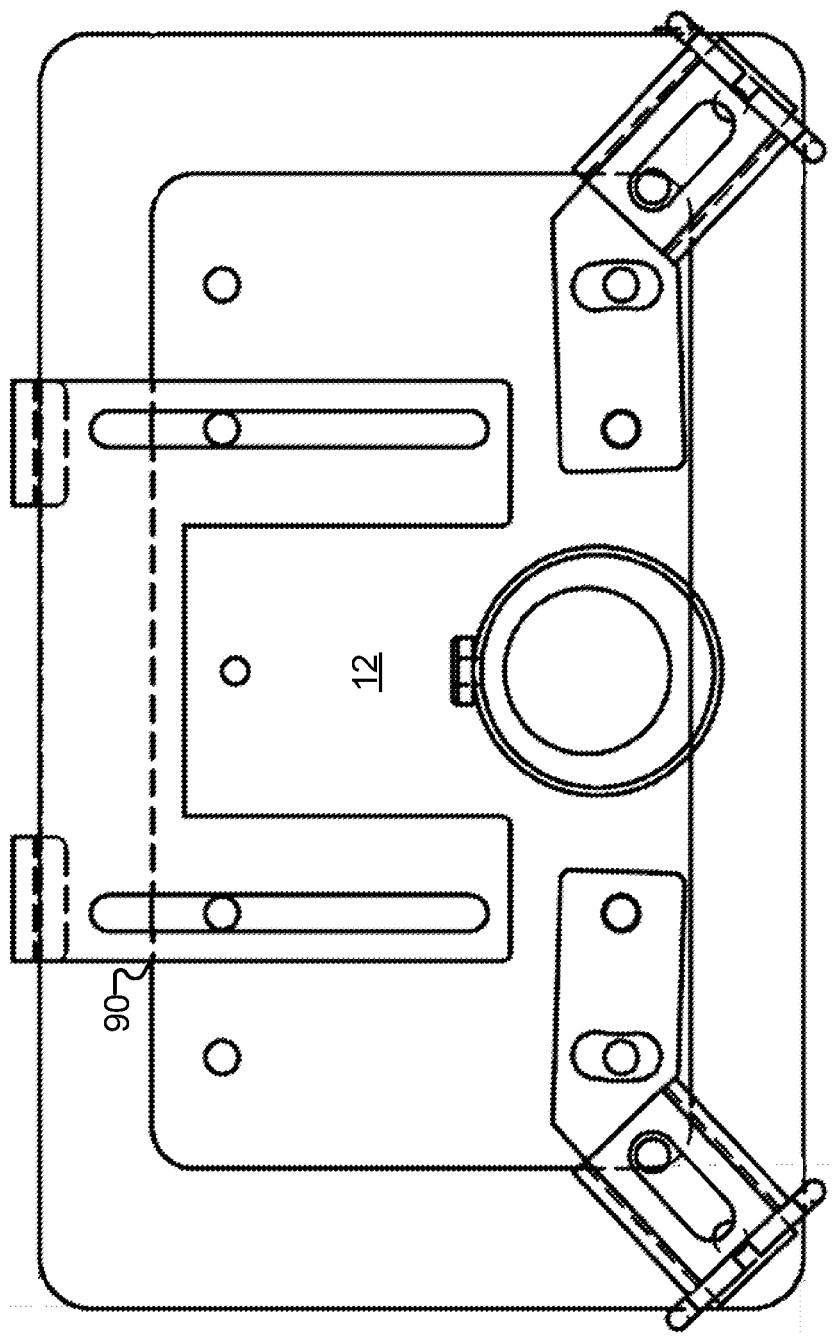
FIG. 7 is a bottom plan view of an apparatus according to yet another example embodiment used to secure a different rectangular device.

Apparatus 10 may also be reconfigured to secure differently dimensioned devices by substituting differently dimensioned stop members 20 and/or retaining members 30. FIGS. 6 and 7 show, respectively, apparatus 80 and apparatus 90 that each include base 12 outfitted with retaining members (not specifically enumerated) that are differently dimensioned than the retaining members 30 of apparatus 10 and apparatus 70. Stop members and retaining members may be provided in a variety of different sizes.

Figure 8:
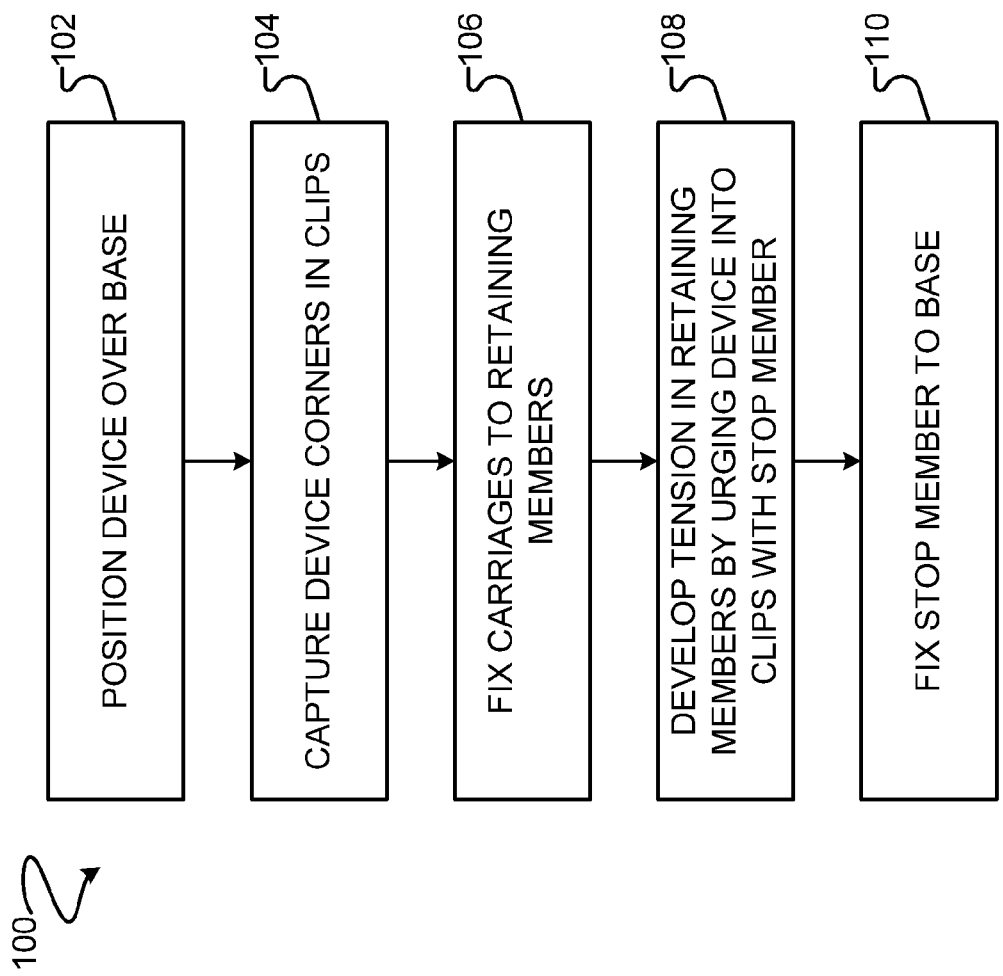
FIG. 8 is a flowchart of a method according to an example embodiment for securing a device.

Apparatus 10 enables several convenient methods for securing a device D. FIG. 8 is a flowchart that illustrates one such method, namely a method 100 for securing a rectangular device. In step 102, a device is positioned over base 12. In step 104 of method 100, clips 50 are positioned to capture adjacent corners of the device. In step 106, the positions of carriages 40 are fixed relative to retaining members 30. Step 108 comprises developing tension in retaining members 30 by urging the device toward clips 50 with stop member 20. Step 108 may comprise placing stop member 20 into abutment with a side of the device that is spaced apart from the adjacent corners retained in clips 50 and moving stop member 20 toward clips 50 along its single free degree of movement until further movement is prevented by tension acting against the corners of the device retained in clips 50. In step 108, the movement of stop member 20 toward clips 50 causes the corners of the device captured in clips 50 to push clips 50 away from base 12. This results in tension on carriages 40 and retaining members 30, which may cause retaining members 30 to pivot about axes co-axial with apertures 35. In some embodiments, the method further comprises adjusting the angle of clips 50 relative to the corners of device D being secured by rotating retaining members 30 about axes co-axial with apertures 35 so that clips 50 are squarely or nearly squarely engaged with the corners of device D. In the illustrated embodiment, this involves adjusting the angle formed between second portions 53 and 54 of clips 50 and the edges of device D to be approximately 45°, which optionally includes adjusting the longitudinal position of the carriages 40 relative to second portions 32 of retaining members 30 before securing carriages 40 to retaining members 30. When no slack remains in retaining members 30, carriages 40 and clips 50, further movement of stop member 20 toward clips 50 is prevented. In step 110, the position of stop member 20 is fixed relative to base 12.

It will be appreciated that other methods of securing device D in apparatus 10 are possible. For instance, stop member 20 may be adjusted along apertures 26 with device D in abutment with hooked portions 24 of stop member 20 to approximately center device D over base 12. Stop member 20 may then be fixed in this position using headed fasteners engaged in apertures 26. Retaining members 30, carriages 40, and clips 50 can then be positioned to capture the corners of device D under tension, and locked in place.

Where a component is referred to above (e.g., a base, stop member, arm, cross member, J-shaped portion, aperture, fastener, post, retaining member, carriage, clip, etc.), unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout this application, the words "comprise," "comprising," and the like are to be construed in an inclusive sense, as opposed to an exclusive or exhaustive sense; that is to say, in the sense of "including, but not limited to." Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of example embodiments is not intended to be exhaustive or to limit this application to the precise forms disclosed above. While specific examples of, and examples for, embodiments are described above for illustrative purposes, various equivalent modifications are possible within the scope of the technology, as those skilled in the relevant art will recognize. The illustrative purposes mentioned herein are not intended to be exhaustive or limiting of the possible applications of the technology. For example, apparatus and methods embodying the technology disclosed herein are not limited to use for securing products in a retail setting, and may be applied to secure products in other contexts, for instance in commercial establishments, educational institutions, government service branches, or other organizations where a tablet computer or other portable electronic device may be made temporarily available to a user for the purpose of reviewing or inputting certain information (e.g. reviewing a menu and submitting a food order in a restaurant; answering questionnaires in a government or health care professional office; or the like).

These and other changes can be made to apparatus and methods disclosed herein in light of the above description.

While the above description describes certain examples of the technology, and describes the best mode contemplated, no matter how detailed the above appears in text, the technology can be practiced in many ways. As noted above, particular terminology used when describing certain features or aspects of disclosed apparatus and methods should not be taken to imply that the terminology is being redefined herein to be restricted to any specific characteristics, features, or aspects of the system with which that terminology is associated. In general, the terms used in the following claims should not be construed to limit the technology to the specific examples disclosed in the specification, unless the above description section explicitly and restrictively defines such terms. Accordingly, the actual scope of the technology encompasses not only the disclosed examples, but also all equivalent ways of practicing or implementing the technology.

From the foregoing, it will be appreciated that specific examples of apparatus have been described herein for purposes of illustration, but that various modifications, alterations, additions and permutations may be made without departing from the practice of the invention. The embodiments described herein are only examples. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

Some non-limiting examples of variations on the example embodiments described herein include the following:

Base 12 may have different configurations. For instance, base 12 could have different arrangements of apertures, such as to enable apparatus 10 to be used with various mounting devices (posts, stands, and brackets, etc.) and accommodate variously configured retaining members.

It is not necessary that stop member 20 and/or retaining members 30 be rotationally universal when based 12 is switched between landscape and portrait orientations.

It is not necessary that the arrangement of apertures in base 12 exhibit the same degree of symmetry as the arrangement of the example embodiment described herein. For instance, apertures 17A, 17B, 18A and 18B may be arranged in a non-square rectangular configuration. Thus, it is possible to configure apparatus 10 such that registration of apertures 26 of stop member 20 is possible with only some, but not all, of the combinations of apertures set out in paragraph [0049] above.

Stop member 20 and/or retaining members 30 may have greater or fewer apertures than shown in the example embodiments described herein. For example, stop member 20 may comprise additional oblong apertures parallel to apertures 26A and 26B to enable stop member 20 to be used with bases having apertures arranged differently than base 12 (e.g., bases in which apertures 17A, 17B, 18A and 18B are arranged in a non-square rectangular configuration).

What is claimed is:

1. Apparatus for securing a product, the apparatus comprising:
   a base;
   a pair of retaining members, each retaining member pivotally secured at a first end thereof to the base;
   a pair of carriages, each carriage fixable to a corresponding one of the retaining members, each carriage having a clip for capturing a projecting portion of the product; and
   a stop member movable toward the clips in a single degree of freedom and fixable to the base at a plurality of locations along the degree of freedom, the stop member comprising a portion for engaging a portion of the product which is spaced apart from the projecting portions captured by the clips.

2. Apparatus as defined in claim 1, wherein each one of the carriages is movable along the corresponding one of the retaining members and fixable to the corresponding one of the retaining members at a plurality of locations.

3. Apparatus as defined in claim 1, wherein each one of the retaining members comprises a first elongate portion pivotally secured to the base and a second elongate portion extending at an outwardly obtuse angle from the first portion, each one of the carriages being movable along the second elongate portion of the corresponding one of the retaining members and fixable to the second elongate portion at a plurality of locations.

4. Apparatus as defined in claim 3, wherein the obtuse angle defined by the first and second portions of the retaining members is between about 105° and about 160°.

5. Apparatus as defined in claim 3, wherein the obtuse angle defined between the first and second portions of the retaining members is approximately 135°.

6. Apparatus as defined in claim 3, wherein each one of the retaining members is pivotally secured to the base with two points of contact.

7. Apparatus as defined in claim 6, wherein the two points of contact comprise a pair of fasteners engaged with a pair of longitudinally spaced apertures on the respective retaining members, first ones of the apertures being proximate to a first end of the respective retaining members and second ones of the apertures being distal from the first end of the respective retaining members, the second ones of the apertures comprising an oblong aperture positioned to permit rotational movement of the retaining members about an axis co-axial with the first ones of the apertures, wherein the carriages are provided on the retaining members distally of the first and second apertures.

8. Apparatus as defined in claim 7, wherein each one of the retaining members comprises a first elongate portion pivotally secured to the base and a second elongate portion extending at an outwardly obtuse angle from the first portion, each one of the carriages being movable along the second elongate portion of the corresponding one of the retaining members and fixable to the second elongate portion at a plurality of locations, and wherein the longitudinal dimensions of the oblong apertures are oriented transverse to the lengths of the first elongate portions of the retaining members.

9. Apparatus as defined in claim 8, wherein the fasteners comprise headed fasteners engaged with a pair of apertures provided in the base.

10. Apparatus as defined in claim 8, wherein the clips comprise longitudinal slots extending in a direction parallel to the lengths of respective ones of the second elongate portions of the retaining members, and wherein the clips are mounted for longitudinal travel along the second elongate portions.

11. Apparatus as defined in claim 10, wherein the portions of the clips that engage with the retaining members have a U-channel configuration in cross-section.

12. Apparatus as defined in claim 11, wherein the clips have single degree freedom of movement relative to the retaining members.

13. Apparatus as defined in claim 12, wherein the clips comprise C-shaped tubular members defining four sides of a rectangle, and wherein each side of the rectangle defined by the C-shaped tubular member contacts a different side of the product when the clip is engaged with the projecting portions.

14. Apparatus as defined in claim 13, wherein the C-shaped tubular members intersect the projecting portions of the product at an angle of approximately 45°.

15. Apparatus as defined in claim 12, wherein the clips are disposed to engage squarely with the projecting portions of the product.

16. Apparatus as defined in claim 15, wherein the product has a rectangular slab form factor, and wherein the projecting portions of the product comprise corners of the product.

17. Apparatus as defined in claim 16, wherein the product comprises a tablet computer, a mobile phone, an e-reader, or a system controller.

18. Apparatus for securing a planar product having a polygonal shape, the apparatus comprising:
   a base;
   a pair of rotatable retaining members with clips telescopically engaged at second ends of the respective retaining members for engaging with two corners of the product, first ends of the retaining members being securable to the base to prevent relative motion of the rotatable retaining members relative to the base; and
   a slideable stop member engaged at a second end of the base for engaging with an edge of the product opposite the two corners, the slideable stop member being adjustable towards the pair of rotatable retaining members and securable to the base to prevent relative motion of the slideable stop member relative to the base.

19. Apparatus as defined in claim 18, wherein the rotatable retaining members are coupled to the base at first and second points, and wherein the second point is positioned and configured to permit rotational movement of the retaining members about an axis co-axial with the first point.

20. Apparatus as defined in claim 19, wherein the rotatable retaining members comprise first and second portions, the first portion of the retaining members being engageable with the base and the second portion of the retaining members comprising the clips, wherein the second portion extends at an outwardly obtuse angle from the first portion.

21. A method for securing a product using an apparatus having a base, a pair of retaining members, each retaining member pivotally secured at a first end thereof to the base, a pair of carriages, each carriage movable along a corresponding one of the retaining members and fixable to the corresponding one of the retaining members at a plurality of locations, each carriage having a clip for capturing a projecting portion of the product, and a stop member movable toward the clips in a single degree of freedom and fixable to the base at a plurality of locations along the degree of freedom, the stop member comprising a portion for engaging a portion of the product which is spaced apart from the projecting portions captured by the clips, the method comprising:
   capturing projecting portions of the product in the clips;
   fixing the positions of the carriages relative to the retaining members;
   engaging the spaced apart portion of the product with the portion of the stop member for engaging the spaced apart portion of the product;
   developing tension in the retaining members by urging the product toward the clips with the stop member; and
   when the retaining members are under tension fixing the position of the stop member relative to the base.

22. A method as defined in claim 21, wherein fixing the positions of the carriages relative to the retaining members comprises pivoting the retaining members so that the projecting portions of the product are engaged squarely in the clips.

23. A method as defined in claim 22, wherein the product comprises a tablet computer, a mobile phone, an e-reader, or a system controller.

* * * * *